US011561940B2

(12) United States Patent
Doan Huu

(10) Patent No.: US 11,561,940 B2
(45) Date of Patent: Jan. 24, 2023

(54) AUTOMATIC GENERATIVE PROCESS BRIDGE BETWEEN ANALYTICS MODELS

(71) Applicant: SAP SE, Walldorf (DE)

(72) Inventor: Jacques Doan Huu, Montigny le Bretonneux (FR)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 16/947,563

(22) Filed: Aug. 6, 2020

(65) Prior Publication Data

US 2022/0043784 A1 Feb. 10, 2022

(51) Int. Cl.
*G06F 16/21* (2019.01)
*G06F 16/25* (2019.01)
*G06F 16/28* (2019.01)
*G06F 16/22* (2019.01)

(52) U.S. Cl.
CPC ........ *G06F 16/213* (2019.01); *G06F 16/2282* (2019.01); *G06F 16/25* (2019.01); *G06F 16/284* (2019.01)

(58) Field of Classification Search
CPC .... G06F 16/213; G06F 16/25; G06F 16/2282; G06F 16/284
USPC .................................................. 707/803, 722
See application file for complete search history.

(56) References Cited

U.S. PATENT DOCUMENTS

| 6,915,287 | B1* | 7/2005 | Felsted | G06F 16/289 |
| | | | | 707/999.005 |
| 10,127,250 | B2* | 11/2018 | Dingman | G06F 16/25 |
| 2015/0339415 | A1* | 11/2015 | Klein | G06F 30/20 |
| | | | | 703/6 |
| 2019/0340272 | A1* | 11/2019 | Breiter | G06F 16/2246 |

\* cited by examiner

*Primary Examiner* — Kuen S Lu
(74) *Attorney, Agent, or Firm* — Sterne, Kessler, Goldstein & Fox P.L.L.C.

(57) ABSTRACT

Disclosed herein are system, method, and computer program product embodiments for generating a bridge between analytical models. In an embodiment, a server can extract a first variable dependency schema from a first model (e.g., predictive model or business intelligence report) and a second variable schema from a second model (e.g., predictive model or business intelligence report). The first variable dependency schema includes a first definition of a relationship between a first variable and a second variable. The server can compare the first variable dependency schema and the second variable dependency schema. Furthermore, the server can generate a modification to be made in the second variable dependency schema based on the first definition of the relationship between the first and second variable and outputs the modification to be made to the second variable dependency schema.

20 Claims, 11 Drawing Sheets

US

New York

| Function Area | Experience Level | Salary |
|---|---|---|
| R&D | 1 | 54554 |
| Finance | 1 | 45454 |

| Age |
|---|
| 50 |

San Francisco

| Function Area | Experience Level | Salary |
|---|---|---|
| R&D | 2 | 45454 |
| Finance | 2 | 232332 |

| Age |
|---|
| 32 |

AUTOMATIC GENERATIVE PROCESS BRIDGE BETWEEN ANALYTICS MODELS

BACKGROUND

An analytics application provides functional services to analyze and extract relevant insights from operational data to drive the business process optimally by making an appropriate decision. The functional services can include reporting (e.g., Business Intelligence) and predictive. Conventional systems do not allow reports and predictive models for common data modeling. For example, reports and predictive models do not share variable dependency metadata. This creates a high risk of inconsistency and incompleteness of obtaining a complete view of business data for both business intelligence and predictive perspectives. To align such the report and predictive model, users need to extract and compare variable dependencies manually. This can be a very time consuming and error-prone process.

BRIEF DESCRIPTION OF THE DRAWINGS

The accompanying drawings are incorporated herein and form a part of the specification.

FIG. 6 is a block diagram illustrating a business intelligence report, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating a bridge between analytical models.

In an embodiment, a server can extract a first variable dependency schema from a first model (e.g., predictive model or business intelligence report) and a second variable schema from a second model (e.g., predictive model or business intelligence report). The first variable dependency schema includes a first definition of a relationship between a first variable and a second variable. The server can compare the first variable dependency schema and the second variable dependency schema. Furthermore, the server can generate a modification to be made in the second variable dependency schema based on the first definition of the relationship between the first and second variable and outputs the modification to be made to the second variable dependency schema.

This configuration allows for automatically identifying inconsistencies or differences between different analytical models without having to review the variable dependencies of each analytical model manually. As such, the configuration provides the user with the opportunity to generate complete and accurate analytical models.

Figure 1:
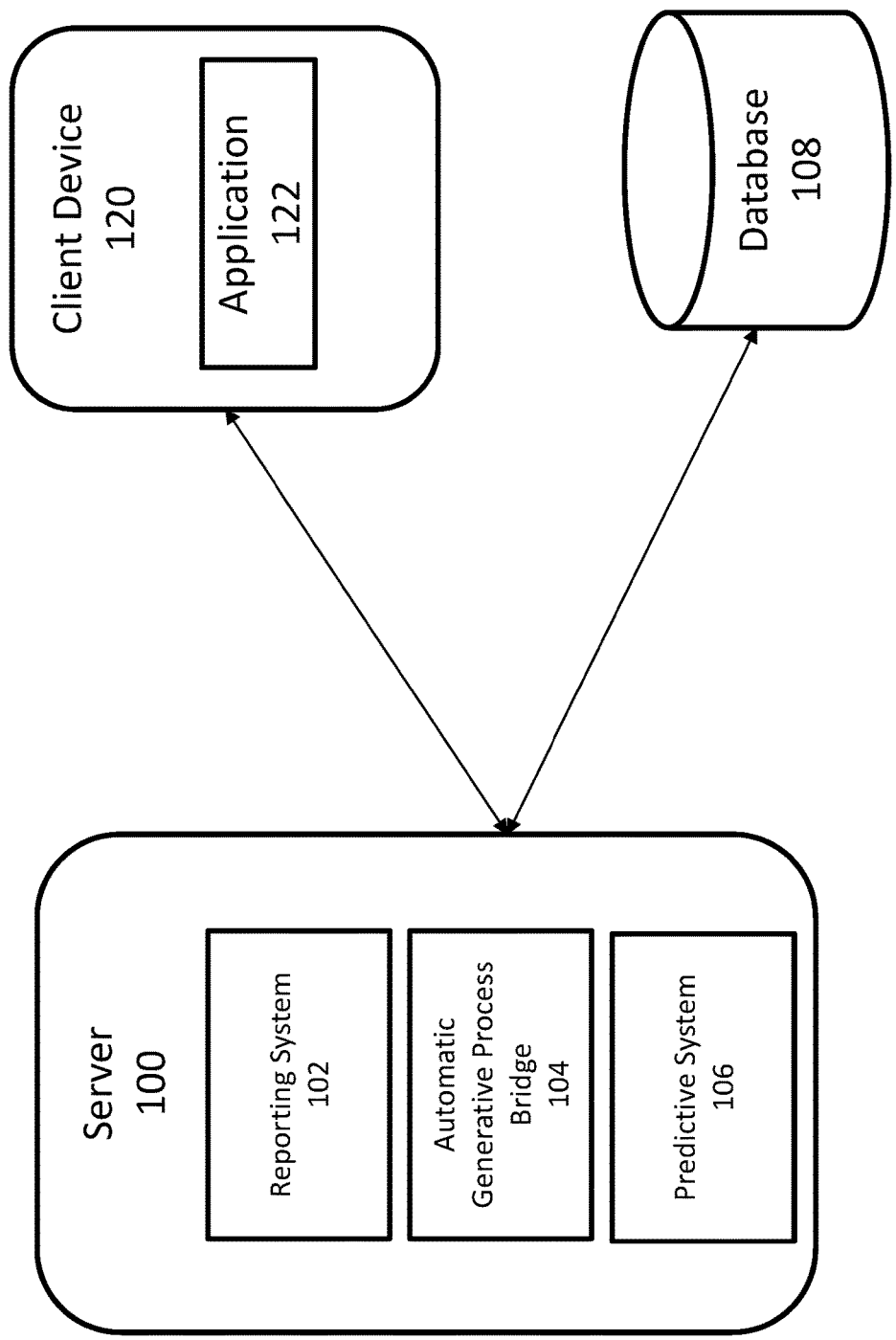
FIG. 1 is a block diagram of a system for identifying discrepancies between analytical models, according to some embodiments.

FIG. 1 is a block diagram of a system for identifying discrepancies between analytical models, according to some embodiments. In an embodiment, the system can include a server 100, database 108, and client device 120. Server 100, client device 120, and database 108 can be connected through wired connections, wireless connections, or a combination of wired and wireless connections.

As an example, server 100, database 108, and client device 120, can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Server 100 can include a reporting system 102, automatic generative process bridge 104, and predictive system 106. Reporting system 102, automatic generative process bridge 104, and predictive system 106 can all reside on server 100. Alternatively, reporting system 102, automatic generative process bridge 104, and predictive system 106 can reside on different server(s).

Client device 120 can include application 122. Application 122 can be used to interface with reporting system 102, automatic generative process bridge 104, and predictive system 106.

Reporting system 102 and predictive system 106 can be configured to generate analytical models, such as business intelligence reports and predictive models. For example, reporting system 102 can generate a business intelligence report in response to a request received from application 122. Reporting system 102 can include a collection of tools providing the capacity to extract, transform, and present data in a suitable and user-friendly format. The business intelligence report can include table, chart, cross-table, section, cell, or the like. The values of the tables, charts, cross-table, section, or cell can be determined based on an algorithm executed on the available data.

Reporting system 102 can use a report variable dependency schema to generate a business intelligence report. A structure of a business intelligence report includes report blocks. Report blocks can be one of a table, free cell, or cross table. A variable is either a dimension or a measure (e.g., dependent variable).

The report variable dependency schema includes defined relationships between different variables. The relationship can include variable dependencies. As a non-limiting example, the report variable dependency schema can indicate that a person's grade in school can depend on a person's age. As such, the person's grade in school may be a dependent variable in the report variable dependency schema, which depends on another variable, the person's age. The report variable dependency schema can be pre-defined. Reporting system 102 can use the report variable dependency schema to execute the algorithm on known data to generate the business intelligence report.

In a business intelligence report, the data is shaped into a multidimensional structure (e.g., OLAP cube) where the variable is either measure (it has an aggregation function) or dimension (with discrete values). The dependent variable is the measure a user wants to understand its distribution in a multidimensional space where each axis is the input variable. For example, an OLAP cube for a Human Resources department of a company can include Salary and Age variables as dependent variables aggregating with average function and (Function Area, Country, Manager, City, and Experience Level) as dimension. This cube can be used to analyze Salary and Age metrics depending on the dimension values (subspace of the multidimensional cube). The reporting structure can be a tree of report elements where a leaf node is cell element or chart element, section levels are nested, and table or cross-table are composed of cells.

For example, the reporting system 102 can receive a request to generate a business intelligence report about the sales of a product by region from application 122. The report variable dependency schema may indicate that product sales is a dependent variable that depends on variables such as the climate of a region, average household salaries of a region, and average age of a person in the region. Reporting system 102 can generate a business intelligence report indicating the sales of a product by region and how the climate, average household salaries, and average age of the person influences the product sales in the region.

Predictive system 106 can generate predictive models in response to a request received from application 122. Predictive system 106 can use advanced learning algorithms or descriptive statistics aimed to discover and quantify automatically hidden dependency relationships between variables of interest and dependent variable (target variable), in supervised mode. Predictive system 106 uses a data collection from the past history so that a machine learning algorithm can "learn" the dependencies of other (input) variable to the target (dependent) variable. Predictive system 106 can use supervised predictive models to quantify the influence of input variables on the target (dependent variable). Predictive system 106 can use generate a predictive variable dependency schema that defines the influence of the input variables on the target.

Predictive models take n input variables (e.g., predictors) to predict the target variable (e.g., dependent variable), which can be either continuous (regression) or categorical (classification). Predictive models can be supervised predictive models such as classification, regression, and time-series models. A predictive variable dependency schema is composed of n dependency relations where the strength of a relationship is estimated by a machine learning algorithm. In particular, the machine learning algorithm can compute the individual contribution of each predictor. As an example, SHAP value on decision tree estimator is a possible way to attribute these relative contributions. The machine learning algorithm may assign a null strength if no impact is observed from training samples. As such, this non-dependency relation is still kept as informative to remove it in the destination variable dependency schema, if any. The assigned role of an input variable is by default 'influencer' except for variable used to segment the initial training dataset, whose role is, therefore, 'slicer.' The machine learning algorithm can learn and execute predictions on segmented data as dependency patterns may be specific per segment. For example, to forecast the retail sales revenue, it's recommended to segment per country to capture the geographic specificity of sales.

For example, predictive system 106 can receive a request to generate a predictive model about the sales of a product in a region. The dependent (target) variable can be product sales, which depends on variables such as the climate of a region, average household salaries of a region, the average age of a person in the region, and genders of the people living in a region. Predictive system 106 can use historical data about product sales in a given region and a machine-learning algorithm to generate a predictive variable dependency schema indicating the dependencies of product sales on the other variables. Predictive system 106 may also generate a strength value indicating the strength of the dependency between product sales and the other variables. Predictive variable dependency schema 106 may use predictive algorithms and the predictive variable dependency schema to generate a predictive model about sales in a region (e.g., a model predicting the sales in a region over a period of time).

Automatic generative process bridge 104 can periodically extract a report variable dependency schema from a business intelligence report and a predictive variable dependency schema from a predictive model that is related to the same subject (or share the same dependent variable). Automatic generative process bridge 104 can compare the report variable dependency schema and predictive variable dependency schema, with respect to a dependent variable. That is, automatic generative process bridge 104 can identify which variables the dependent variable depends on, in the report variable dependency schema and predictive variable dependency schema. Automatic generative process bridge 104 can identify any discrepancies between the variable dependencies of the dependent variable defined in the report variable dependency schema and variable dependencies of the dependent variable defined in the predictive variable dependency schema. For example, the automatic generative process bridge 104 can determine that the predictive variable dependency schema includes a variable that the dependent variable depends on that is not present in the report variable dependency schema (or vice versa). Furthermore, automatic generative process bridge 104 can determine that the strength of a relationship (dependency) between the dependent variable and another variable, as indicated in the predictive variable dependency schema, is less than a threshold amount. Accordingly, automatic generative process bridge 104 can determine the other variable does not influence the dependent variable, and the other variable should be removed from the report variable dependency schema.

Automatic generative process bridge 104 can generate a modification to be made to either the predictive variable dependency schema or the report variable dependency schema. Automatic generative process bridge 104 can transmit the modification to application 122. Server 100 may receive a request from application 122 to make the modification in either the predictive variable dependency schema or report variable dependency schema. In response to receiving the request, automatic generative process bridge 104 can make the modification to the respective schema and regenerate a business intelligence report or predictive model based on the modified report variable dependency schema or predictive variable dependency schema. Automatic generative process bridge 104 can provide the regenerated business intelligence report or predictive model to application 122.

In other embodiments, automatic generative process bridge 104 can automatically generate the modification to be made to either the predictive variable dependency schema or the report variable dependency schema, make the modification to the respective schema, and regenerate a business intelligence report or predictive model based on the modified report variable dependency schema or predictive variable dependency schema without receiving a request from the application 122. Automatic generative process bridge 104 can provide the regenerated business intelligence report or predictive model to application 122.

Figure 2:
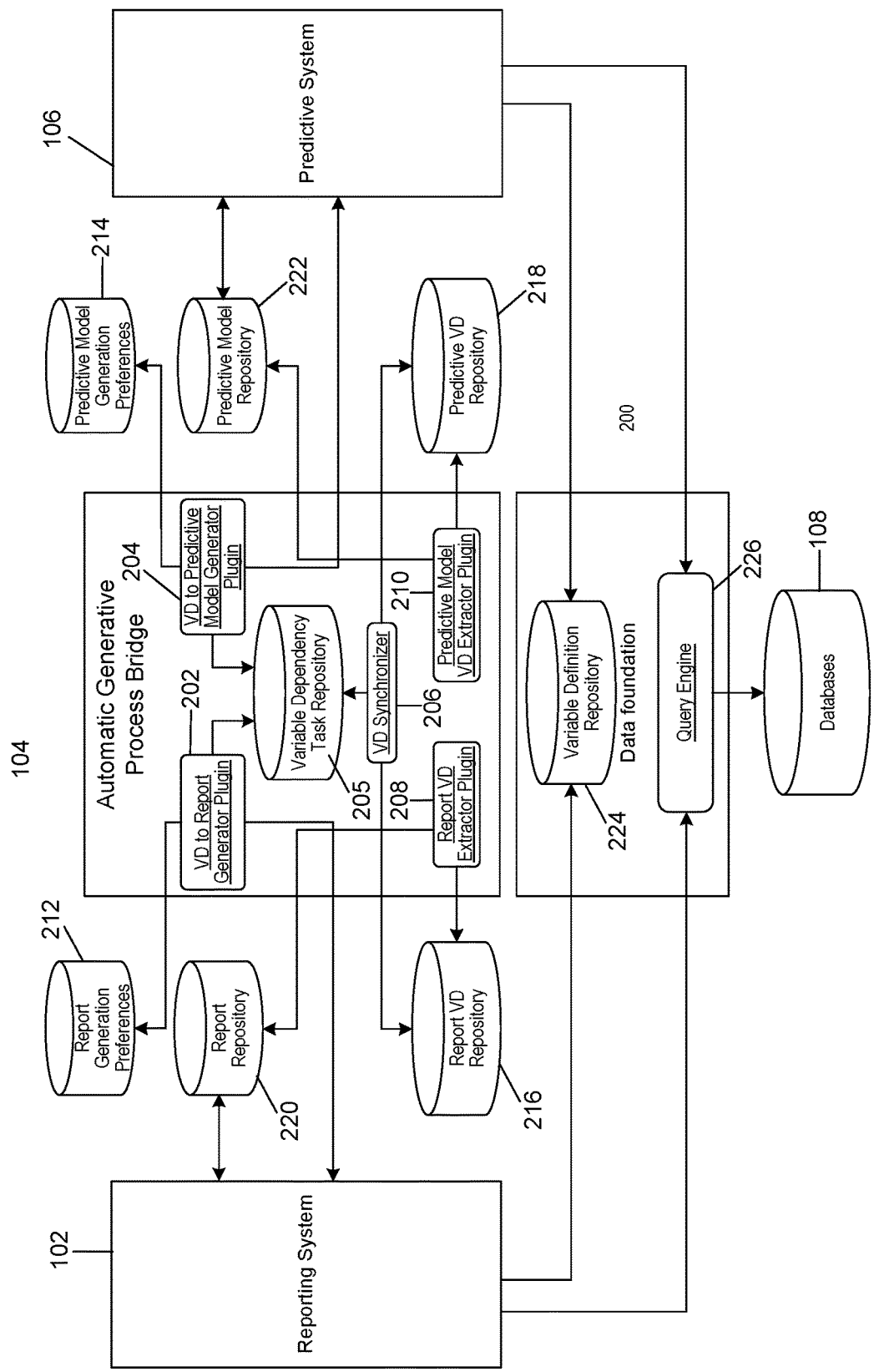
FIG. 2 is a block diagram of an architecture of the system for identifying discrepancies between analytical models, according to some embodiments.

FIG. 2 is a block diagram of an architecture of the system for identifying discrepancies between analytical models, according to some embodiments. The architecture can include reporting system 102, automatic generative process bridge 104, predictive system 106, data foundation 200, and database 108.

Automatic generative process bridge 104 can include a report generator plugin 202, predictive model generator plugin 204, variable dependency task repository 205, variable dependency synchronizer 206, report extractor plugin 208, and predictive model extractor plugin 210.

Report generator plugin 202 can interface with reporting system 102, variable dependency task repository 205, and a report generation preferences repository 212. Predictive model generator plugin 204 can interface with predictive system 106, variable dependency task repository 205, and a predictive model generation preferences repository 214.

Variable dependency synchronizer 206 can interface with variable dependency task repository 205, a report variable dependency repository 216, and a predictive variable dependency repository 218.

Report extractor plugin 208 can interface with report variable dependency repository 216, and a report repository 220. Predictive model extractor plugin 210 can interface with predictive variable dependency repository 218 and a predictive model repository 222.

Data foundation 200 can include a variable definition repository 224 and query engine 226. Query engine 226 can interface with database 108.

Reporting system 102 can interface with report repository 220, variable definition repository 224, and query engine 226. Predictive system 106 can interface with predictive model repository 222, variable definition repository 224, and query engine 226.

In an embodiment, reporting system 102 can store all generated business intelligence reports in reporting repository 220. Predictive system 106 can store all generated predictive models in predictive model repository 222. Reporting system 102 and predictive system 106 can use variable data stored in variable definition repository 224 to generate the business intelligence reports and predictive models, respectively. The variable definition repository 224 can store data associated with variables. For example, variable definition repository 224 can include data related to a variable "sales data." Reporting system 102 and predictive system 106 can also use data stored in database 108 to generate business intelligence reports and predictive models, respectively.

Report extractor plugin 208 can periodically scan reporting repository 220 and extract a fully qualified variable dependency from a business intelligence report stored in reporting repository 220. Predictive model extractor plugin 210 can periodically scan predictive model repository 222 to extract a fully qualified variable dependency schema from a predictive model stored in predictive model repository 222. Report extractor plugin 208 and predictive model extractor plugin 210 can be configured to introspect the business intelligence report or predictive model definition to identify the underlying variable dependency schema. Report extractor plugin 208 can store the extracted report variable dependency schema (from the business intelligence report) in report variable dependency repository 216, and predictive model extractor plugin 210 can store the predictive variable dependency schema (from the predictive model) in predictive variable dependency repository 218.

Variable dependency synchronizer 206 can compare a report variable dependency schema and a predictive variable dependency schema that share the same or similar dependent variables. Variable dependency synchronizer 206 can identify the differences or discrepancies between the report variable dependency schema and predictive variable dependency schema, based on the comparison. Variable dependency synchronizer 206 can store variable dependency task repository 205.

Report generator plugin 202 can retrieve the differences or discrepancies between the report variable dependency schema and predictive variable dependency schema. Furthermore, report generator plugin 202 can retrieve a user's (e.g., a user of the client device 120) preferences from report generation preferences repository 212. The preferences can include that the user prefers that report generator plugin 202 automatically modify the report variable dependency schema based on the differences and discrepancies without confirmation from the user. Report generator plugin 202 can also automatically generate (or regenerate) the business intelligence report based on the modified report variable dependency schema, without confirmation from the user.

Alternatively, the preferences can include that the user prefers that report generator plugin 202 provide the proposed modification for the report variable dependency schema to the user for confirmation before making the modification. In response to receiving confirmation, report generator plugin 202 can make the modification and generate (or regenerate the business intelligence report based on the modified report variable dependency schema.

The preferences can further include report templates, report styles, colors, graph types, chart types, cell background, or the like. Report model generator plugin 202 can generate the business intelligence report based on the preferences.

Predictive model generator plugin 204 can retrieve the differences or discrepancies between the report variable dependency schema and predictive variable dependency schema from variable dependency task repository 205. Furthermore, predictive model generator plugin 204 can retrieve a user's (e.g., a user of the client device 120) preferences from predictive model generation preferences repository 214. The preferences can include that the user prefers that predictive model generator plugin 204 automatically modify the predictive variable dependency schema based on the differences and discrepancies, without a confirmation from the user. Predictive generator plugin 204 can also automatically generate (or regenerate) the predictive model based on the modified predictive variable dependency schema, without confirmation from the user.

Alternatively, the preferences can include that the user prefers that predictive model generator plugin 204 provide the proposed modification for the predictive variable dependency schema to the user for confirmation before making the modification. In response to receiving confirmation, predictive model generator plugin 204 can make the modification and generate (or regenerate the predictive model based on the modified predictive variable dependency schema.

The preferences can further include a type of predictive model, type of chart, colors, or the like. Predictive model generator plugin 204 can generate the predictive model based on the preferences.

As an example, report variable dependency repository 216 or predictive variable dependency repository 218 can store the data as depicted in Table 1, as shown below:

TABLE 1

| Artifact | Artifact Item | Input Variable | Dependent Variable | Strength | Condition | Oriented | Date |
|---|---|---|---|---|---|---|---|
| A1 | I1 | V1 | V5 | 0.9 | V10 in (US, France, UK) | TRUE | 11/05/2019 13:45 |
| A1 | I1 | V2 | V5 | 0.5 | V10 in (US, France, UK) | TRUE | 11/05/2019 13:45 |
| A1 | I1 | V1 | V2 | 0.2 | V10 in (US, France, UK) | FALSE | 11/05/2019 13:45 |
| A2 | I2 | V10 | V12 | 0.8 | V2 = Car | TRUE | 12/20/2019 13:58 |

In Table 1, Artifact can refer to the business intelligence report or predictive model. The first three rows represent the pairwise dependency information of a given relation (V1, V2, V5) extracted from artifact item A1/I1. The Artifact and Artifact Item columns can store IDs corresponding to the Artifact and Artifact Item from which the variable information was extracted. The Artifact Item can be specific to the business intelligence report. For example, the Artifact Item can be a table, chart, or cell elements. The Input Variable column can store an input variable ID of an input variable. An input variable is a variable on which the dependent variable depends. The dependent variable column can store the variable ID of a dependent variable.

The Condition column includes the predicate formula. The predicate formula defines the context of the extracted relation. The Oriented column can store a Boolean value of True or False. Oriented when true means that the individual dependency relation is oriented from input to the dependent variable; otherwise, the input and dependent variable are mutually dependent. Date column tracks the recording date. The Role column can indicate the role of the input variable with respect to the dependent variable. The role can be influencer or slicer.

As indicated above, a predictive variable dependency schema can be extracted from a predictive model, and a reporting variable dependency schema can be extracted from a business intelligence report.

In another example, predictive model extractor plugin 210 can extract the data from a predictive model for predicting which variables affect the dependent variable "passExam" (e.g., which factors affect whether a student passes an exam) in the state of California. The extracted data is included in Table 2, as shown below.

In Table 2, the artifact column can include the ID for the predictive model. The Artifact Item column can be empty because the predictive model may not include an Artifact Item, as indicated above. The Input Variables column can include avgGrade (average grade), mainProfessor (main professor), and age. The Dependent Variable column can include passExam (pass exam). The Strength column can include the strength of the relationship between the input variable and the dependent variable. The higher the value in the Strength value, the stronger the relationship between the input variable and the dependent variable. The Condition column can restrict the model to the state of California. The Role column can indicate the role of the input variable with respect to the dependent variable. For example, avgGrade and age can have the role of influencers over passExam. That is, predictive system 106 can treat the avgGrade and age input variables as affecting whether a student passes an exam. The mainProfessor input variable can be a slicer. A slicer is used to "slice" the initial data to produce segment/section instances. In this example, the predictive model can be divided into sections based on the main professor.

The data from Table 2 can be embodied as a predictive variable dependency schema. Predictive model extractor plugin 210 can store the predictive variable dependency schema in predictive variable dependency repository 218.

Report extractor plugin 208 can extract similar data from a business intelligence report (embodied as a report variable dependency schema) store the report variable dependency schema in the report dependency repository 216. For extracting data from the business intelligence reports, including a table or cross table, report extractor plugin 208 can determine that if a terminal cell does not reference a dependent variable, the input variables are the upper section variables. In a chart, table, or cross-table of a business intelligence report, all child elements that reference the dependent variable are also dependent variables. The input variables are the variable composition of the associated axes plus the upper section variables (with slicer role).

As an example, the input variables avgGrade and mainProfessor, included in the predictive variable dependency schema, may be absent from the report variable dependency schema. Furthermore, input variables hasScholorship and

TABLE 2

| Artifact | Artifact Item | Input Variable | Dependent Variable | Strength | Condition | Oriented | Date | Role |
|---|---|---|---|---|---|---|---|---|
| A1 | | avgGrade | passExam | 0.2 | State=California | TRUE | 11/05/2019 13:45 | influencer |
| A1 | | mainProfessor | passExam | 0.5 | State=California | TRUE | 11/05/2019 13:45 | slicer |
| A1 | | age | passExam | 0.0 | State=California | TRUE | 11/05/2019 13:45 | influencer | hasBrothers, which were absent from predictive variable dependency schema, can be included in the report variable dependency schema.

Variable dependency synchronizer 206 can retrieve the report variable dependency schema and predictive variable dependency schema stored in the report dependency repository 216 and predictive variable dependency repository 218, respectively. Variable dependency synchronizer 206 can compare the report variable dependency schema and predictive variable dependency schema and identify any differences or discrepancies.

Variable dependency synchronizer 206 can determine whether an input variable is present in report variable dependency schema or predictive variable dependency schema and absent in the other schema. In this case, variable synchronizer 206 can generate a modification to add the input variable in the schema in which the input variable is absent. For example, variable dependency synchronizer 206 can identify that input variables avgGrade and mainProfessor, included in the predictive variable dependency schema, are absent from the report variable dependency schema. Variable dependency synchronizer 206 can generate a modification to add input variables avgGrade and mainProfessor in the report variable dependency schema.

Furthermore, variable dependency synchronizer 206 can also determine whether the strength value of an input variable and dependent variable is lower than a threshold value. For example, variable dependency synchronizer can determine that the strength value of input variable, age, and dependent variable, passExam, in the predictive variable dependency schema is 0, which is below the threshold value. As such, variable dependency synchronizer 206 can determine age does not affect whether a student passes an exam. Therefore, variable dependency synchronizer 206 can generate a modification to remove the input variable, age, from report variable dependency schema.

Variable dependency synchronizer 206 can also determine whether a new role should be assigned to an input variable. The role can be either 'influencer' or 'slicer': slicer corresponds to section layout in reporting world and segmentation in predictive world. If the two schemas define two different roles for the same input variable with respect to the dependent variable, variable dependency synchronizer 206 can modify the role of the input variable in one of the schema's to match the role of the input variable in the other schema, based on user preferences.

In other embodiments, variable dependency synchronizer 206 can also determine that a dependent variable is absent in one of the schemas and present in the other schema. In this regard, variable dependency synchronizer 206 can generate a modification to add the dependent variable to the schema in which the dependent variable is absent by replicating all of its dependencies from the schema in which the dependent variable is present.

The modification can be embodied as a task to be performed. The task can include the destination system (reporting or predictive), destination artifact (business intelligence report or predictive model), input variable, dependent variable, task to be performed, orientation, placement, and role. Table 3, as shown below, illustrates the tasks to be performed on the two schemas.

3 3

| Destination System | Destination Artifact | Destination Artifact Item | Input Variable | Dependent Variable | Task | Oriented | Placement | Role |
|---|---|---|---|---|---|---|---|---|
| Reporting | A20 | I1 | age | passExam | remove | TRUE | | |
| Reporting | A20 | I1 | avgGrade | passExam | add | TRUE | mainProfessor > avgGrade | influencer |
| Reporting | A20 | I1 | mainProfessor | passExam | add | TRUE | mainProfessor > avgGrade | slicer |
| Predictive | A40 | I2 | hasBrothers | passExam | add | TRUE | | influencer |
| Predictive | A40 | I2 | hasScolarship | passExam | add | TRUE | | influencer |

In Table 3, the Destination System column indicates which system (reporting or predictive) the modification is to be made. This may also indicate which schema to modify. The Destination Artifact column may include IDs corresponding to the business intelligence report or predictive model affected by the modification. The Destination Artifact Id column may indicate the artifact ID affected by the modification. The Input Variable column may include the input variable to be modified. The Dependent Variable column may include the dependent variable. The Task column may include the task to be performed (e.g., add, assign a new role, or remove). The Orientation may include a Boolean value. When the value is true in the Oriented column, that the individual dependency relation is oriented from input to dependent variable; otherwise, the input and dependent variable are mutually dependent. The Placement column may include relative placement hints in the destination artifact item from most influencing to less influencing. The Role column may include the role of the input variable.

As shown in Table 3, the input variable, age, is to be removed from the reporting variable dependency schema because the strength value of the relationship between is lower than a threshold amount in the predictive variable dependency schema. Furthermore, input variables, avgGrade, and mainProfessor are to be added to the reporting variable dependency schema. The avgGrade input variable is to be added as an influencer, and the mainProfessor input variable is to be added as a slicer. Additionally, the input variables hasBrothers and hasScholorship, which are to be added to the predictive variable dependency schema. The hasBrothers and hasScholorship input variables are to be added as influencers. The tasks indicated in Table 3 can be added to variable dependency task repository 205.

Report generator plugin 202 can retrieve the tasks from variable dependency task repository 205 specific to reporting system 102. In this regard, Reporting generator plugin 202 generates proposed modification(s) for removing the input variable, age, and add input variables avgGrade and mainProfessor to the reporting variable dependency schema.

Reporting generator plugin 202 can transmit the proposed modification(s) to the client device for confirmation that the user wants to make the proposed modification(s) to the reporting variable dependency schema. In response to receiving confirmation that the user wants to make the proposed modification(s) to the reporting variable dependency schema, Reporting generator plugin 202 can load the business intelligence report and the corresponding to the reporting variable dependency schema. Reporting generator plugin 202 can add the input variables, hasBrothers, and mainProfessor to the reporting variable dependency schema based on the placement. For example, the most influencing variable can be on the leftmost side of the business intelligence report. Furthermore, Reporting generator plugin 202 can remove the input variable, age from the reporting variable dependency schema. In the event, the tasks included a role assignment operation, report generator plugin 202 can assign a new role to an input variable. For example, in the event, the new role of an input variable is a slicer, report generator plugin 202 can move the cell referencing the input variable to the report section and vice versa.

Reporting generator plugin 202 can regenerate (or generate a new) a business intelligence report using the modified reporting variable dependency schema. The Reporting generator plugin 202 can use retrieve the user preferences from report generation preferences repository 212 to regenerate the business intelligence report.

The report generator plugin 202 can transmit regenerated business intelligence report to the client device. As described above, report generator plugin 202 can automatically modify the report variable dependency schema and regenerate the business intelligence report without the confirmation of the user.

Predictive model generator plugin 204 can retrieve the tasks from variable dependency task repository 205 specific to predictive system 102. In this regard, predictive generator plugin 202 generates proposed modification(s) for adding input variables hasBrothers and hasScholorship to the reporting variable dependency schema.

Predictive model generator plugin 204 can transmit the proposed modification(s) to the client device for confirmation that the user wants to make the proposed modification(s) to the predictive variable dependency schema. In response to receiving confirmation that the user wants to make the proposed modification(s) to the predictive variable dependency schema, predictive model generator plugin 202 can load the predictive model and the corresponding to the predictive variable dependency schema. Predictive generator plugin 202 can add the input variables, hasBrothers and hasScholorship, to the predictive variable dependency schema based on the placement. In the event, the modification is to remove an input variable, predictive model generator plugin 204 can remove the input variable. In the event, the modification includes a role assignment operation, predictive model generator plugin 204 can assign a new role to an input variable.

Predictive model generator plugin 204 can regenerate (or generate a new) a business intelligence report using the modified reporting variable dependency schema. The predictive model generator plugin 204 can use retrieve the user preferences from predictive model generation preferences repository 214 to regenerate the predictive model.

Predictive model generator plugin 204 can transmit the regenerated predictive model to the client device. As described above, predictive model generator plugin 204 can automatically modify the report variable dependency schema, regenerate the predictive model, and transmit the regenerated predictive model to the client device, without the confirmation of the user.

Figure 3:
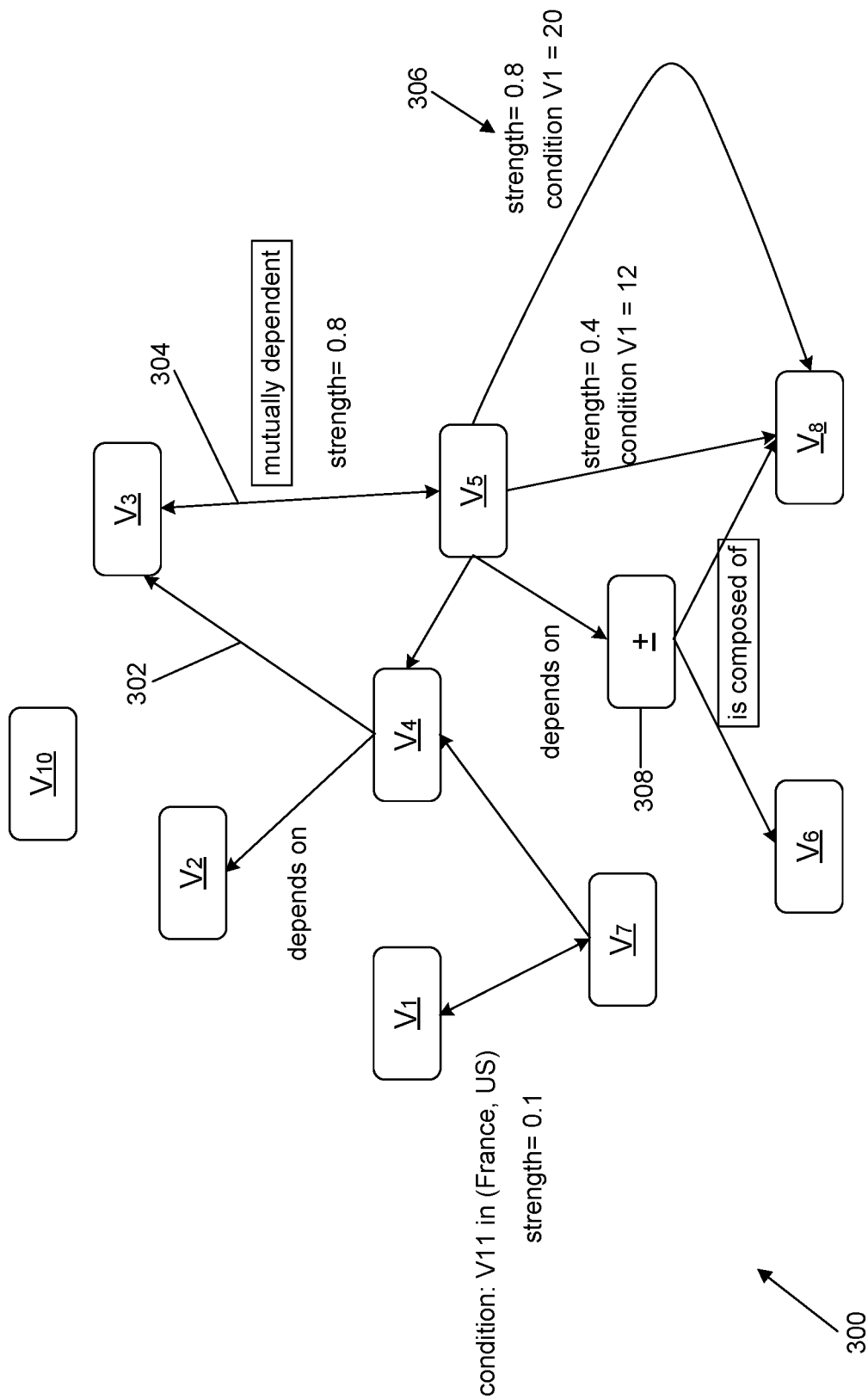
FIG. 3 is a block diagram of a functional dependency graph, according to some embodiments.

FIG. 3 is a block diagram of a functional dependency graph 300, according to example embodiments. Functional dependency graph 300 can be a report variable dependency schema or a predictive variable dependency schema. Functional dependency graph 300 can include variables $V_{1-8}$ and $V_{10}$.

A relationship between variables $V_{1-8}$ and $V_{10}$ can be indicated by the arrow between the variables. If the arrow starts from a first variable and points to a second variable, the first variable depends on the second variable. For example, arrow 302 indicates that $V_4$ depends on $V_3$. Furthermore, a bidirectional arrow indicates a mutually dependent relationship. For example, arrow 304 indicates a mutually dependent relationship between $V_3$ and $V_5$.

Functional dependency graph 300 can further include strength and condition information 306. Strength can indicate the strength of a relationship between two variables. The strength can be normalized in the range of [−1, 1]. The closer the strength value is to 1, indicates that a strong positive correlation between the two variables. The closer the strength value is to −1, indicates a strong negative correlation between the two variables. The closer the strength value is to 0, indicates the lack of relationship between the two variables. That is, the two variables are independent to each other. Condition can indicate under which condition/context the dependency has been established (e.g., $V_2$='California' or $V_3$=12).

Multiple relations can co-exist between two variables if there are conditions. For example, $V_5$ and $V_8$ have 2 relations with distinct contexts ($V_1$=12 vs. $V_1$=20). Indeed, dependency measurement (strength in particular) is susceptible to the context, and in some situations, they may vary a lot.

Functional dependency graph 300 can further include node 308. Node 308 can represent a combined operation between variable $V_6$ and $V_8$, on which variable $V_5$ depends. Machine learning algorithms like Gradient Boosting, coupled with the SHAP framework, can compute the importance of combined variables (also known as interaction effect) and the individual variables (also known as main effect) to determine a target variable.

Figure 4:
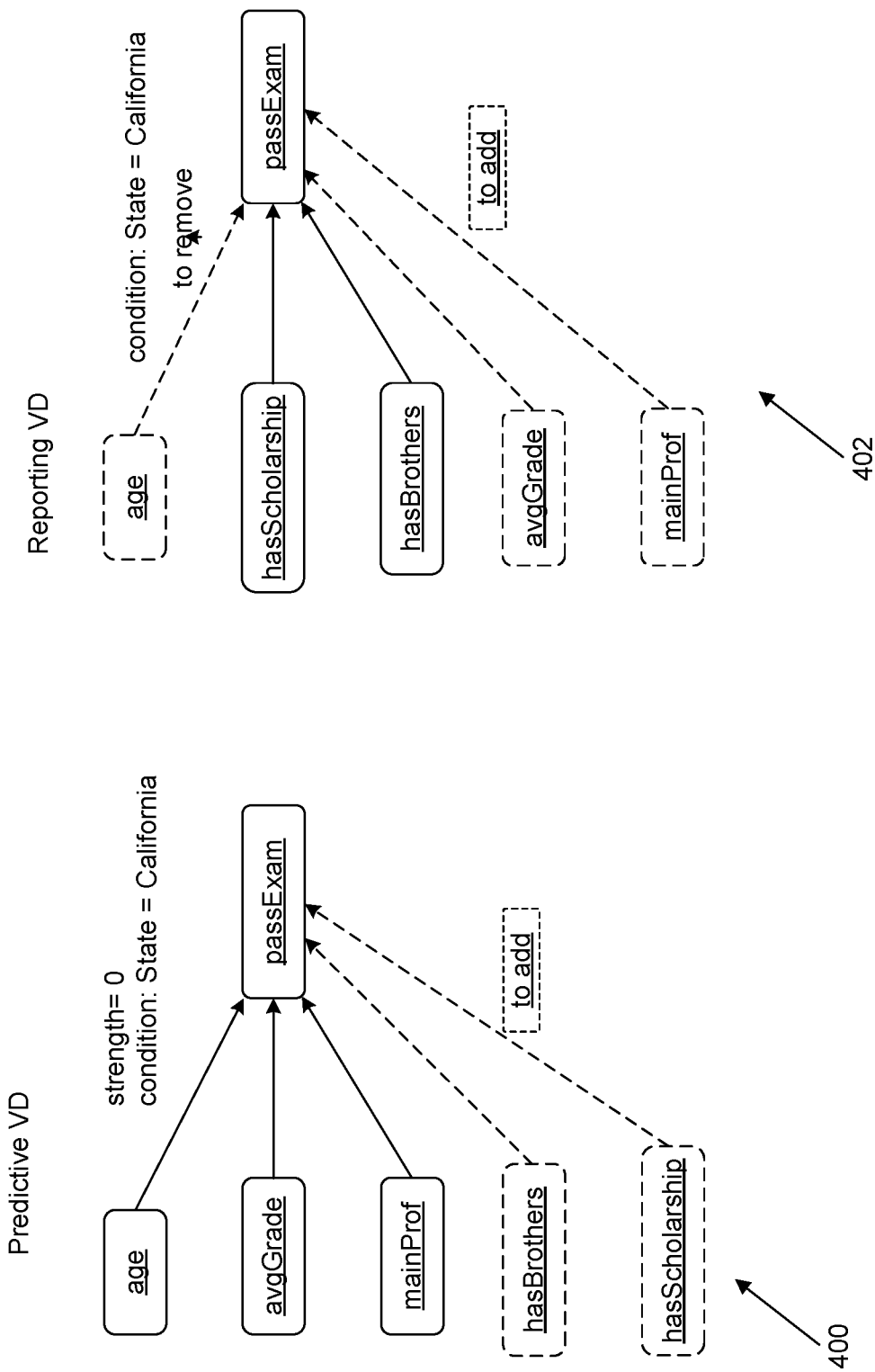
FIG. 4 is a block diagram depicting a predictive variable dependency schema and a reporting variable dependency schema, according to some embodiments.

FIG. 4 is a block diagram depicting a predictive variable dependency schema 400 and a reporting variable dependency schema 402, according to some embodiments. As indicated in FIG. 1, predictive variable dependency schema 400 can include input variables, age, avgGrade, and mainProf. Furthermore, predictive variable dependency schema 400 can include a dependent variable, passExam. Reporting variable dependency schema 402 can include input variables, age, hasScholorship, and hasBrothers. Reporting variable dependency schema 402 can include a dependent variable, passExam.

The automatic generative process bridge can determine that the input variables, hasScholorship and hasBrothers, are absent from predictive variable dependency schema 400 and included in report variable dependency schema 402. As such, the automatic generative process bridge can generate a proposed modification to add hasScholorship and hasBrothers to predictive variable dependency schema 400. The proposed modification can include defined relationships to the dependent variable, indicated by arrows. The proposed modification can be shown by the nodes outlined in dotted lines, including hasScholorship and hasBrothers and the dotted line arrows.

The automatic generative process bridge can determine that the input variables, avgGrade, and mainProf are absent from report variable dependency schema 402 and present in predictive variable dependency schema 400. As such, the automatic generative process bridge can generate a proposed modification to add avgGrade and mainProf to predictive variable dependency schema 400. The proposed modification can include defined relationships to the dependent variable, indicated by arrows. The proposed modification can be shown by the nodes outlined in dotted lines, including avgGrade and mainProf, and the dotted line arrows.

The automatic generative process bridge can determine that the input variable, age, has a strength of 0 in predictive variable dependency schema 400. This can indicate a lack of relationship between the input variable, age, and dependent variable passExam. As such, the automatic generative process bridge can generate a proposed modification to remove the input variable, age, from report variable dependency schema 402. The proposed modification can be shown by the nodes outlined in dotted lines, including age, and the dotted line arrows.

Figure 5:
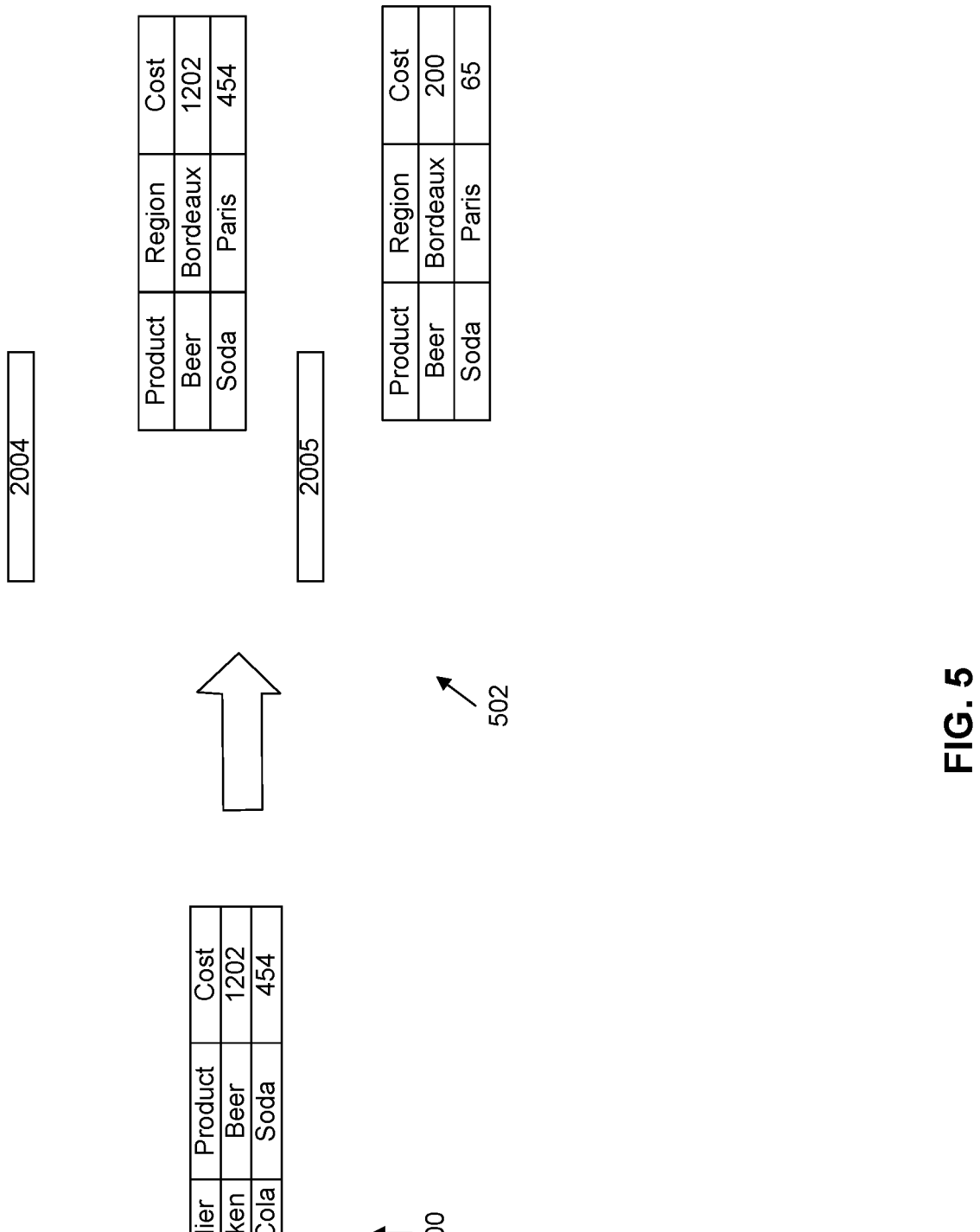
FIG. 5 is a block diagram illustrating an originally generated business intelligence report and a regenerated business intelligence report, according to some embodiments.

FIG. 5 is a block diagram illustrating an originally generated business intelligence report 500 and a regenerated business intelligence report 502, according to some embodiments. As a non-limiting example, the automatic generative process bridge can extract a reporting variable dependency schema for business intelligence report 500. Business intelligence report 500 can include a dependent variable of cost and input variables of year, supplier, and product.

Furthermore, the automatic generative process bridge can extract a predictive variable dependency schema for a predictive model with a dependent variable of cost (the same dependent variable in business intelligence report 500). The predictive variable dependency schema can include the following:

Table 5 indicates a task for assigning a new role (from influencer to slicer) to the input variable, year, in the reporting variable dependency schema, based on the role assigned to the input variable, year, in the predictive variable dependency schema. Furthermore, Table 5 indicates a task for adding input variable, region (as an influencer), to the reporting variable dependency schema, based on the input variable, region, being absent in the reporting variable dependency schema and present in the predictive variable dependency schema. Table 5 can also indicate a task for removing the input variable, supplier, from the reporting variable dependency schema, based on the strength value of the relationship between the input variable, supplier, and dependent variable, cost, being 0 in the predictive variable dependency schema.

The automatic generative process bridge can make the proposed modifications to the reporting variable dependency schema by executing the tasks in Table 5. The automatic generative process bridge can regenerate business intelligence report 502. Regenerated business intelligence report 502 can include the input variable year as a slicer to segment the tables. The year may have a underlying dependency relationship to cost as a slicer. The input variable year be a section part of regenerated business intelligence report 502.

TABLE 4

| Artifact | Artifact Item | Input Variable | Dependent Variable | Strength | Condition | Oriented | Date | Role |
|---|---|---|---|---|---|---|---|---|
| A1 | | Year | Cost | | | TRUE | 11/05/2019 13:45 | slicer |
| A1 | | Product | Cost | 0.7 | | TRUE | 11/05/2019 13:45 | influencer |
| A1 | | Region | Cost | 0.3 | | TRUE | 11/05/2019 13:45 | influencer |
| A1 | | Supplier | Cost | 0 | | TRUE | 11/05/2019 13:45 | influencer |

Table 4 indicates that the predictive dependency schema includes a dependent variable of cost and input variables of year, product, region, and supplier. The input variable, supplier, can have a strength value of 0. This can indicate a lack of relationship between supplier and cost. Furthermore, the input variable, year, can have a role of a slicer.

The automatic generative process bridge can compare business intelligence report 500 and information in the predictive variable dependency schema, as shown in Table 4. The automatic generative process bridge can determine the business intelligence report 500 and predictive model have the same dependent variable, cost, and a minimum of common input variables (Product, Year). The automatic generative process bridge can generate the tasks (e.g., proposed modifications) for the reporting variable dependency schema, based on the compassion of the report variable dependency schema and the predictive variable dependency schema. The tasks can include the following:

The section part of regenerated business intelligence report 502 provides an effective way to present input variables, product, region, and dependent variable cost. Furthermore, regenerated business intelligence report 502 can include input variables, region and product as an influencers of cost. That is, cost as a measure is aggregated by region and product (in table) and year (in section). Lastly, the input variable, supplier, has been removed from regenerated business intelligence report 502.

FIG. 6 is a block diagram illustrating a business intelligence report 600, according to some embodiments. As a non-limiting example, the automatic generative process bridge can extract a reporting variable dependency schema for business intelligence report 600. The reporting variable dependency schema can include the following:

TABLE 5

| Destination System | Destination Artifact | Destination Artifact Item | Input Variable | Dependent Variable | Task | Oriented | Placement | Role |
|---|---|---|---|---|---|---|---|---|
| Reporting | A20 | I15 | Year | Cost | assign role | TRUE | | Slicer |
| Reporting | A20 | I15 | Region | Cost | add | TRUE | Product > Region | influencer |
| Reporting | A20 | I15 | Supplier | Cost | remove | TRUE | | |

TABLE 6

| Artifact | Artifact Item | Input Variable | Dependent Variable | Strength | Condition | Oriented | Date | Role |
|---|---|---|---|---|---|---|---|---|
| A1 | I10 | Country | Age | | Manager='John Fargo' | TRUE | 11/05/2019 13:45 | slicer |
| A1 | I10 | City | Age | | Manager='John Fargo' | TRUE | 11/05/2019 13:45 | slicer |
| A1 | I20 | Country | Salary | | Manager='John Fargo' | TRUE | 11/05/2019 13:45 | slicer |
| A1 | I20 | City | Salary | | Manager='John Fargo' | TRUE | 11/05/2019 13:45 | slicer |
| A1 | I20 | Function Area | Salary | | Manager='John Fargo' | TRUE | 11/05/2019 13:45 | influencer |
| A1 | I20 | Finance | Salary | | Manager='John Fargo' | TRUE | 11/05/2019 13:45 | influencer |

The automatic generative process bridge can extract a predictive variable dependency schema from a predictive model. The automatic generative process bridge can compare the reporting variable dependency schema (e.g., Table 6) with the predictive variable dependency schema. The automatic generative process bridge can determine that the predictive variable dependency schema does not include input variables, city, and experience level, with respect to the dependent variable, salary. Furthermore, the automatic generative process bridge can determine that the predictive variable dependency schema defines the role of input variable, country, as an influencer, rather than a slicer, as defined in the reporting variable dependency schema.

The automatic generative process bridge can generate proposed modifications for the predictive variable dependency schema, as indicated by the following tasks:

TABLE 7

| Destination System | Destination Artifact | Destination Artifact Item | Input Variable | Dependent Variable | Task | Oriented | Placement | Role |
|---|---|---|---|---|---|---|---|---|
| Predictive | A40 | | City | Salary | add | TRUE | | influencer |
| Predictive | A40 | | Country | Salary | assign role | TRUE | | slicer |
| Predictive | A40 | | Experience Level | Salary | add | TRUE | | influencer |

The proposed modifications in Table 7 indicate adding input variables, city and experience level, and changing the role of influencer to slicer for input variable, country, to the predictive variable dependency schema. These modifications indicate a business intelligence modeling expert's intent into the predictive world. For example, the business intelligence expert may know that the input variable, experience level, variable influences the dependent variable, salary, when designing business intelligence report 600. Furthermore, the business intelligence expert knows that salary distribution differs significantly based on the country; therefore, the input variable is used as a slicer business intelligence report 600.

The automatic generative process bridge can make the proposed modifications to the predictive variable dependency schema based on the tasks indicated in Table 7 and regenerate the predictive model.

Figure 7:
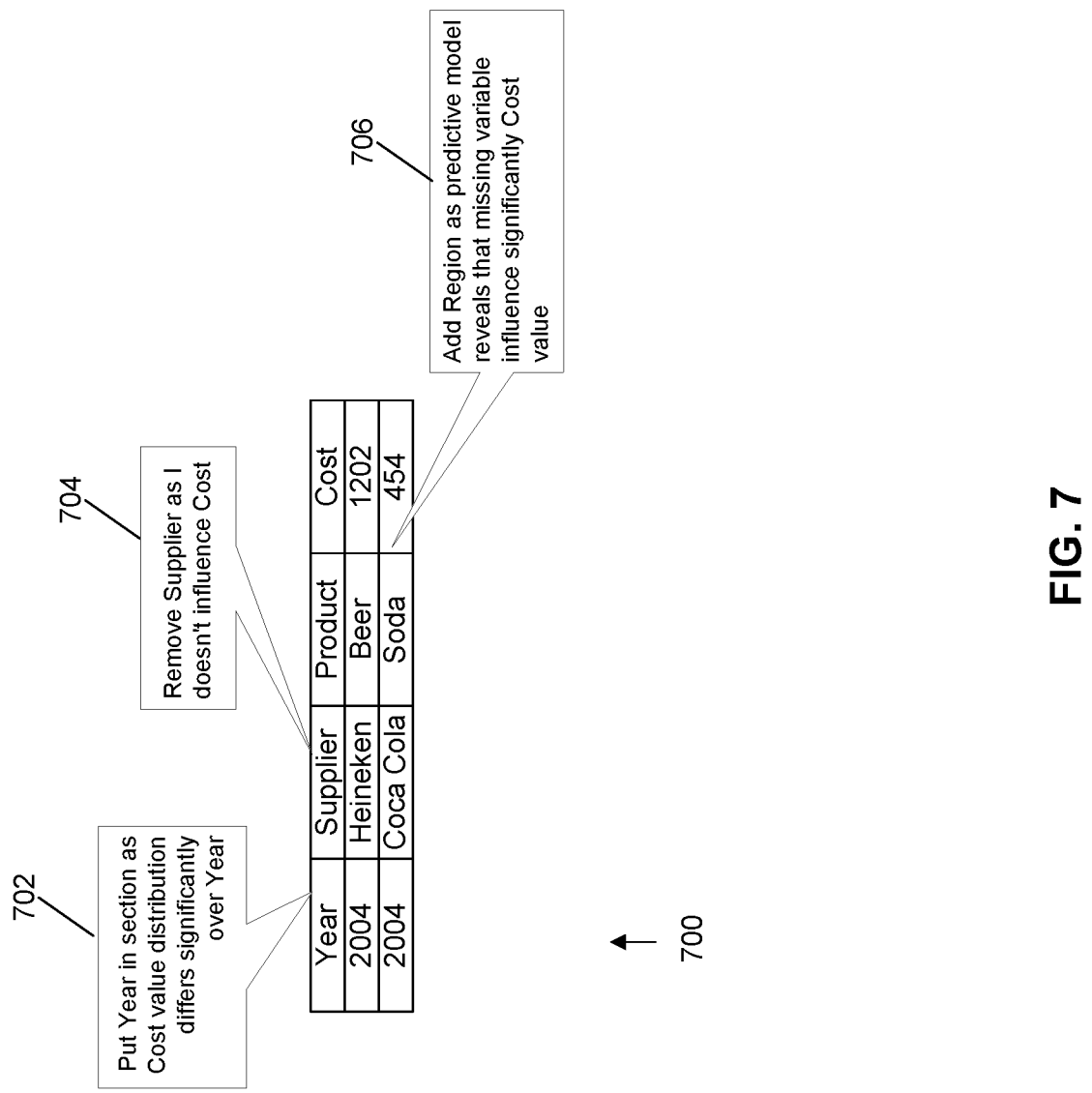
FIG. 7 is a block diagram illustrating proposed modifications to a business intelligence report, according to some embodiments.

FIG. 7 is a block diagram illustrating proposed modifications to a business intelligence report 700, according to some embodiments. The automatic generative process bridge can generate proposed modifications to a business intelligence report and its corresponding report variable dependency schema. As an example, proposed modifications 702-706 can be transmitted to the client device. Proposed modifications 702-706 can be overlaid on business intelligence report 700. Proposed modification 702 can indicate "Put Year in section as Cost value distribution differs significantly over Year." Proposed modification 704 can indicate "Remove Supplier as it doesn't influence Cost." Proposed modification 706 can indicate "Add Region as predictive model reveals that missing variable influence significantly Cost value." The user of the client device can accept some, none, or all of the proposed modifications.

Figure 8:
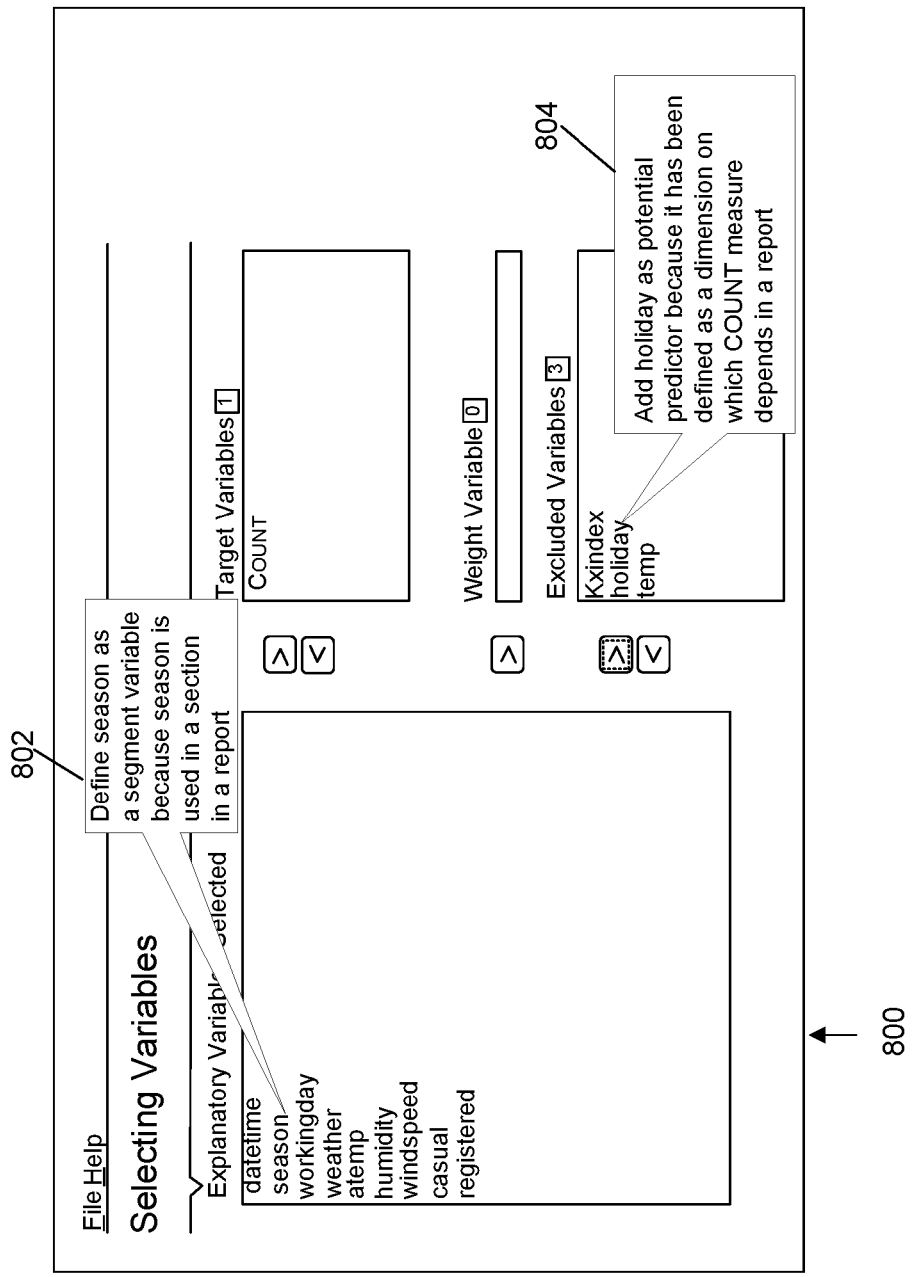
FIG. 8 is a block diagram illustrating proposed modifications to a predictive model, according to some embodiments.

FIG. 8 is a block diagram illustrating proposed modifications to a predictive model, according to some embodiments. The automatic generative process bridge can generate proposed modifications 802-804 to the predictive model and corresponding predictive variable dependency schema. The predictive model may be generated using a predictive designer environment 800. The automatic generative process bridge can transmit proposed modifications 802-804. Proposed modifications 802-804 can be overlaid on predictive designer environment 800. Proposed modification 802 can indicate, "Define season as a segment variable because season is used a section in a report." Proposed modification 804 can indicate, "Add holiday as potential predictor because it has been defined as a dimension on which COUNT measure depends in a report."

Figure 9:
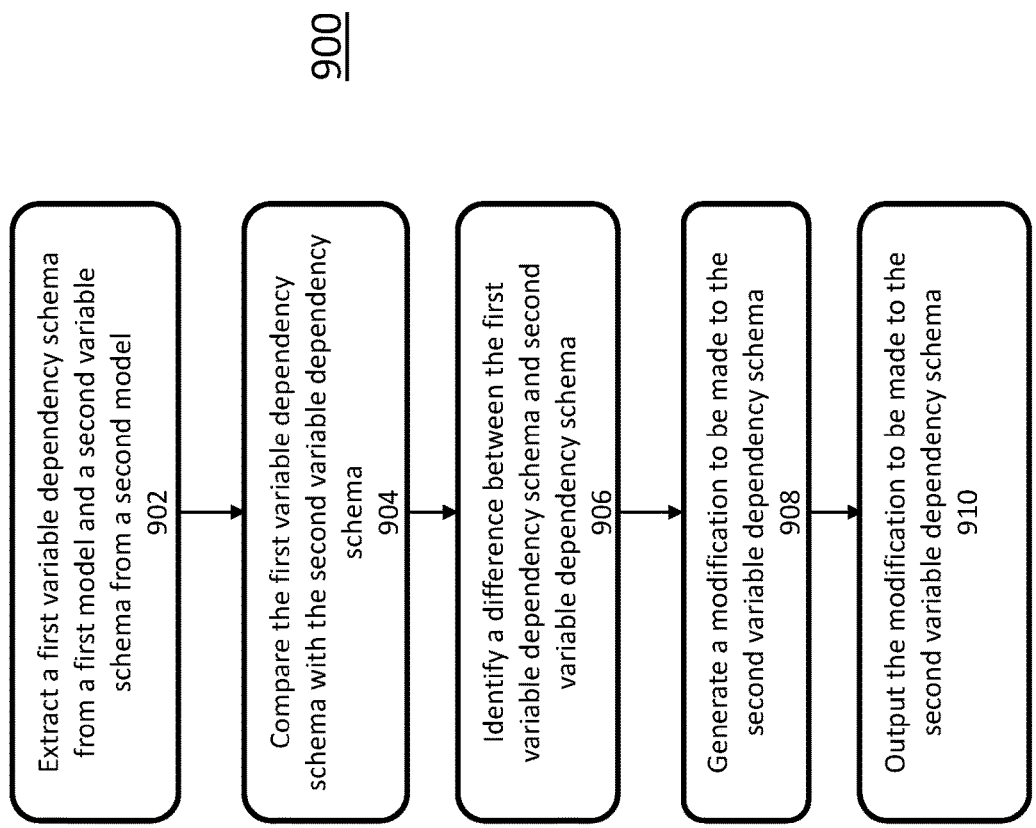
FIG. 9 is a flowchart illustrating a process of identifying a discrepancy between two analytical models, according to some embodiments.

FIG. 9 is a flowchart illustrating a process for generating a modification to be made to a model, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 9, as will be understood by a person of ordinary skill in the art.

Method 900 shall be described with reference to FIG. 1. However, method 900 is not limited to that example embodiment.

In 902, automatic generative process bridge 104 extracts a first variable dependency schema from a first model and a second variable schema from a second model. The first variable dependency schema includes a first definition of a relationship between a first variable and a second variable. The first model can be a business intelligence report or predictive model. As such, the first variable dependency schema can be a report variable dependency schema, and the second variable dependency schema can be a predictive variable dependency schema or vice versa. The first variable dependency schema can include input variables and a dependent variable. The dependent variables can be dependent on the input variables. The first variable can be a dependent variable, and the second variable can be an input variable. The relationship defined in the first variable dependency schema can indicate the dependency of the first variable to the second variable.

In 904, automatic generative process bridge 104 compares the first variable dependency schema with the second variable dependency schema. Automatic generative process bridge 104 can compare the relationships of the first variable with the input variables in both the first variable dependency schema with the second variable dependency schema.

In 906, automatic generative process bridge 104 identifies a difference between the first variable dependency schema and the second variable dependency schema, with respect to the first definition of the relationship between the first and second variables in the first variable dependency schema. The difference can be the absence of the second variable in the second variable dependency schema. Furthermore, the difference can be that a strength value of the relationship between the first and second variable is less than a threshold amount in the first variable dependency schema. Additionally, the difference can be the role of the second variable is different in the first variable dependency schema as compared to the second variable dependency schema.

In 908, automatic generative process bridge 104 generates a modification to be made to the second variable dependency schema based on the identified difference. The modification can be adding the second variable to the second variable dependency schema, removing the second variable from the second variable dependency schema, or changing the role of the second variable in the second variable dependency schema.

In 910, automatic generative process bridge 104 can output the modification to be made to the second variable dependency schema to client device 120. A user of the client device 120 can confirm or reject the modification using the client device 120.

Figure 10:
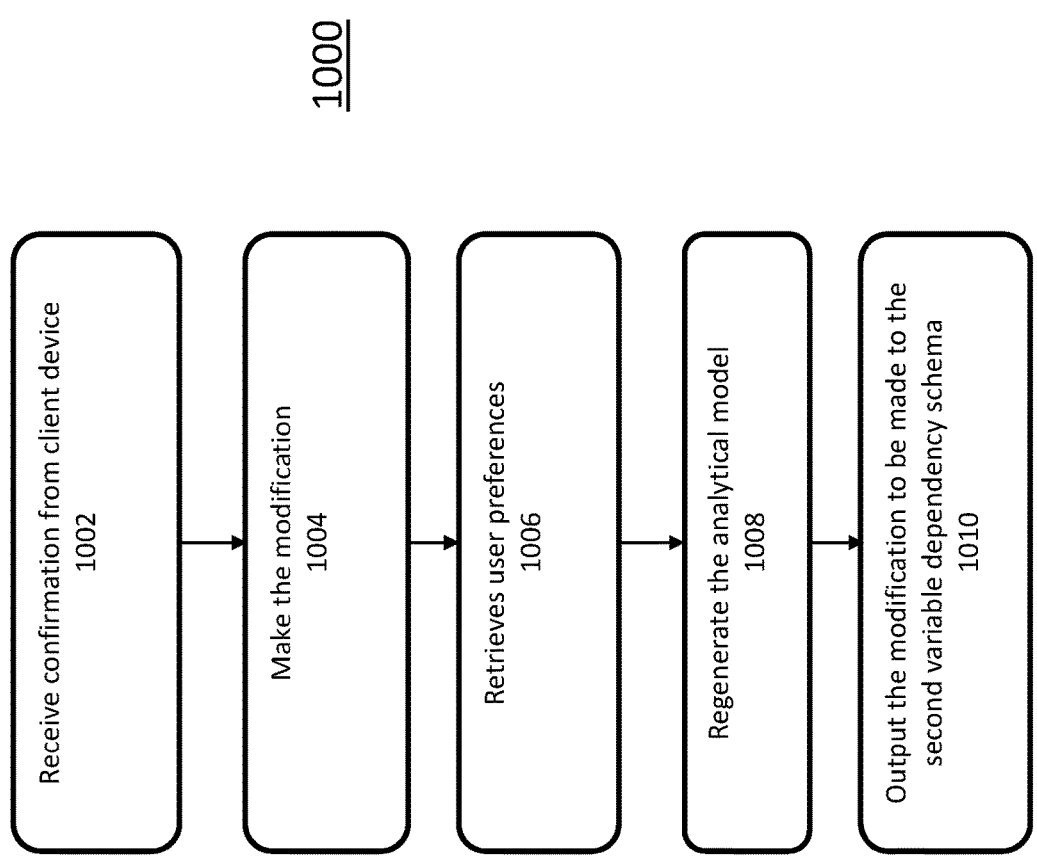
FIG. 10 is a flowchart illustrating a process for making a modification to an analytical model, according to some embodiments.

FIG. 10 is a flowchart illustrating a regenerating an analytical model, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 10, as will be understood by a person of ordinary skill in the art.

Method 1000 shall be described with reference to FIG. 1. However, method 1000 is not limited to that example embodiment.

In 1002, automatic generative process bridge 104 receives confirmation from client device 120 to make a modification to a report variable dependency schema or a predictive variable dependency schema and to regenerate the analytical model (e.g., business intelligence report or predictive model) corresponding to the respective schema.

In 1004, automatic generative process bridge 104 makes the modification to the report variable dependency schema or predictive variable dependency schema. The modification can be adding an input variable to the schema, removing an input variable from a schema, or changing the role of an input variable in a schema.

In 1006, automatic generative process bridge 104 retrieves user preferences for generating the analytical model. The user preferences can include report type of predictive model, templates, report styles, colors, graph types, chart types, cell background, or the like.

In 1008, automatic generative process bridge 104 regenerates the analytical model using the modified report variable dependency schema or predictive variable dependency schema and user preferences.

In 1010, automatic generative process bridge 104 transmits the regenerated analytical model to the client device 120. The client device can render the regenerated analytical model on the application 122.

Figure 11:
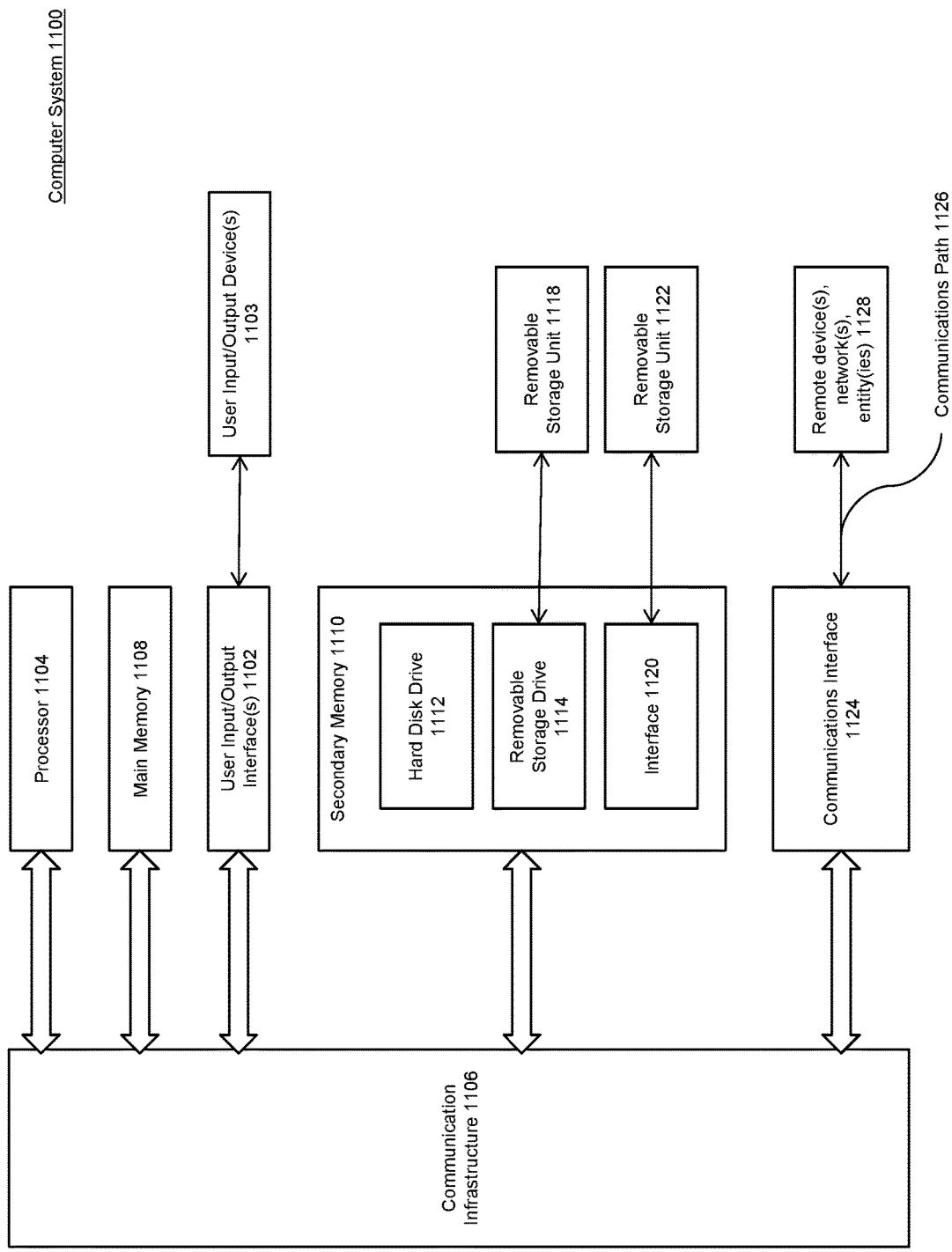
FIG. 11 is an example computer system useful for implementing various embodiments.

Various embodiments can be implemented, for example, using one or more computer systems, such as computer system 1100 shown in FIG. 11. Computer system 1100 can be used, for example, to implement method 900 of FIG. 9 and 1000 of FIG. 10. Furthermore, computer system 1100 can be at least part of reporting system 102, automatic generative process bridge 104, and predictive system 106, as shown in FIG. 1. For example, computer system 1100 can generate analytical models and identify discrepancies between analytical models. Computer system 1100 can be any computer capable of performing the functions described herein.

Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 can include one or more levels of cache. Main memory 1108 has stored therein control logic (i.e., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 can include other means, instrumentalities, or other approaches for allowing computer programs and/or other instructions and/or data to be accessed by computer system 1100. Such means, instrumentalities, or other approaches can include, for example, a removable storage unit 1122 and an interface 1120. Examples of the removable storage unit 1122 and the interface 1120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 can allow computer system 1100 to communicate with remote devices 1128 over communications path 1126, which can be wired and/or wireless, and which can include any combination of LANs, WANs, the Internet, etc. Control logic and/or data can be transmitted to and from computer system 1100 via communication path 1126.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    periodically scanning, by one or more computing devices, a first repository storing a plurality of first models and a second repository storing a plurality of second models;
    extracting, by one or more computing devices, a first variable dependency schema from a first model of the plurality of first models in the repository and a second variable dependency schema from a second model of the plurality of second models in the repository, wherein the first model is a reporting model and the second model is a predictive model, and the first variable dependency schema including a first definition of a relationship between a first variable and a second variable;
    comparing, by one or more computing devices, the first variable dependency schema and the second variable dependency schema;
    generating, by the one or more computing devices, a modification to be made in the second variable dependency schema based on the first definition of the relationship between the first and second variable and a value of a strength of the relationship between the first and second variable in the first variable dependency schema; and outputting, by the one or more computing devices, the modification to the second variable dependency schema.

2. The method of claim 1, further comprising identifying, by the one or more computing devices, the first variable based on a dependency of the first variable on the second variable.

3. The method of claim 1, further determining, by the one or more computing devices, the value of the strength of the relationship is lower than a threshold value; and
removing, by the one or more computing devices, the second variable based on the value of the strength of the relationship is lower than the threshold value.

4. The method of claim 1, wherein the relationship of the first and second variables are used to generate the first model.

5. The method of claim 1, further comprising:
modifying, by the one or more computing devices, the second variable dependency schema based on the modification;
regenerating, by the one or more computing devices, the second model using the modified second variable dependency schema;
outputting, by the one or more computing devices, the regenerated second model.

6. The method of claim 5, further comprising:
modifying, by the one or more computing devices, the second variable dependency schema based on the modification in response to receiving a confirmation to make the modification.

7. The method of claim 1, further comprising identifying, by the one or more computing devices, a type of the relationship between the first and second variables, wherein the type of relationship includes an influencer or a slicer.

8. The method of claim 7, wherein the modification includes removing the second variable from the second variable dependency schema or changing the type of relationship.

9. The method of claim 1, further comprising
determining, by the one more computing devices, the second variable is absent from the second variable dependency schema, wherein the modification includes adding the second variable in the second variable dependency schema and defining the relationship between the first and second variables in the second variable dependency schema.

10. A system comprising:
a memory;
a processor coupled to the memory, the processor configured to:
periodically scan a first repository storing a plurality of first models and a second repository storing a plurality of second models;
extract a first variable dependency schema from a first model of the plurality of first models in the repository and a second variable dependency schema from a second model of the plurality of second models in the repository, wherein the first model is a reporting model and the second model is a predictive model, and the first variable dependency schema including a first definition of a relationship between a first variable and a second variable;
compare the first variable dependency schema and the second variable dependency schema;
generate a modification to be made in the second variable dependency schema based on the first definition of the relationship between the first and second variable and a value of a strength of the relationship between the first and second variable in the first variable dependency schema; and
output the modification to the second variable dependency schema.

11. The system of claim 10, the processor configured to identify the first variable based on a dependency of the first variable on the second variable.

12. The system of claim 11, the processor further configured to:
determine the value of the strength of the relationship is lower than a threshold value; and
remove the second variable based on the value of the strength of the relationship is lower than the threshold value.

13. The system of claim 10, the processor further configured to:
modify the second variable dependency schema based on the modification;
regenerate the second model using the modified second variable dependency schema; and
output the regenerated second model.

14. The system of claim 10, the processor further configured to:
modify the second variable dependency schema based on the modification in response to receiving a confirmation to make the modification.

15. The system of claim 10, wherein the modification includes removing the second variable from the second variable dependency schema or changing a type of the relationship.

16. The system of claim 10, the processor further configured to determine the second variable is absent from the second variable dependency schema, wherein the modification includes adding the second variable in the second variable dependency schema and defining the relationship between the first and second variables in the second variable dependency schema.

17. A non-transitory computer-readable medium having instructions stored thereon, execution of which, by one or more processors of a device, cause the one or more processors to perform operations comprising:
periodically scanning a first repository storing a plurality of first models and a second repository storing a plurality of second models;
extracting a first variable dependency schema from a first model of the plurality of first models in the repository and a second variable dependency schema from a second model of the plurality of second models in the repository, wherein the first model is a reporting model and the second model is a predictive model, and the first variable dependency schema including a first definition of a relationship between a first variable and a second variable;
comparing the first variable dependency schema and the second variable dependency schema;
generating a modification to be made in the second variable dependency schema based on the first definition of the relationship between the first and second variable and a value of a strength of the relationship between the first and second variable in the first variable dependency schema; and
outputting the modification to the second variable dependency schema.

18. The non-transitory computer-readable medium of claim 17, the operations further comprising:

modifying the second variable dependency schema based on the modification;
regenerating the second model using the modified second variable dependency schema; and
outputting the regenerated second model.

19. The non-transitory computer-readable medium of claim 17, wherein the modification includes removing the second variable from the second variable dependency schema or changing a type of the relationship.

20. The non-transitory computer-readable medium of claim 17, the operations further comprising determining the second variable is absent from the second variable dependency schema, wherein the modification includes adding the second variable in the second variable dependency schema and defining the relationship between the first and second variables in the second variable dependency schema.

* * * * *